Figure 1:
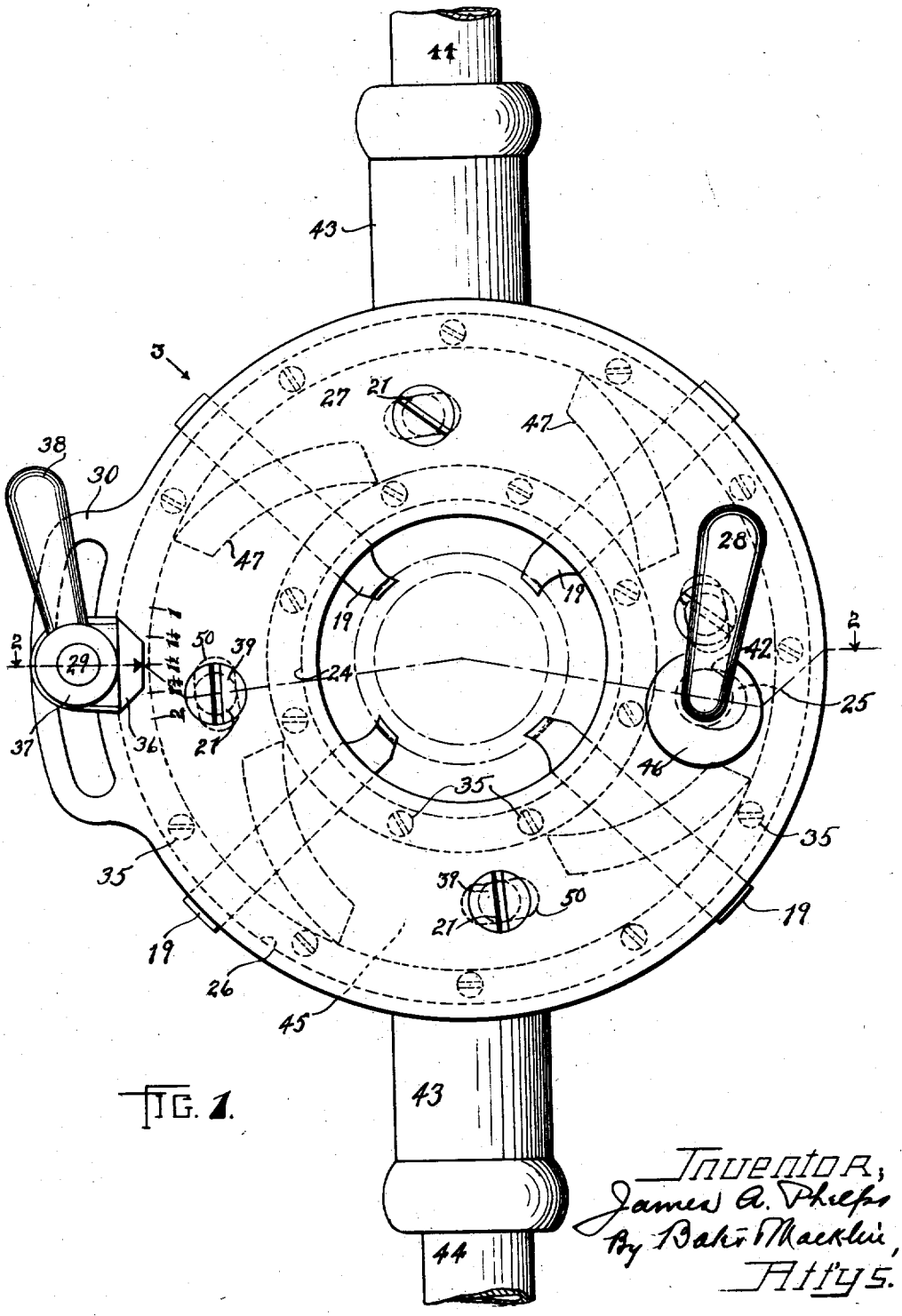

J. A. PHELPS.

DIE STOCK.

APPLICATION FILED MAR. 4, 1918.

Reissued May 7, 1918.

14,470.

4 SHEETS—SHEET 1.

Inventor,
James A. Phelps
By Baker Macklin,
Atty's.

Sackett & Wilhelms Corp. N.Y.

J. A. PHELPS.

DIE STOCK.

APPLICATION FILED MAR. 4, 1918.

Reissued May 7, 1918.

14,470.

4 SHEETS—SHEET 2.

Inventor;
James A. Phelps
By Baker & Macklin, Attys.

J. A. PHELPS.

DIE STOCK.

APPLICATION FILED MAR. 4, 1918.

Reissued May 7, 1918.

14,470.

4 SHEETS—SHEET 3.

Inventor;
James A. Phelps,
By Baker Mackie, Attys.

J. A. PHELPS.

DIE STOCK.

APPLICATION FILED MAR. 4, 1918.

Reissued May 7, 1918.

14,470.

4 SHEETS—SHEET 4.

Inventor;
James A. Phelps.
By Baker Macklin,
Attys.

UNITED STATES PATENT OFFICE.

JAMES A. PHELPS, OF CLEVELAND, OHIO, ASSIGNOR TO BORDEN COMPANY, OF WARREN, OHIO, A CORPORATION OF OHIO.

DIE-STOCK.

14,470. Specification of Reissued Letters Patent. Reissued May 7, 1918.

Original No. 1,036,001, dated August 20, 1912, Serial No. 641,635, filed July 31, 1911. Application for reissue filed March 4, 1918. Serial No. 220,379.

*To all whom it may concern:*

Be it known that I, JAMES A. PHELPS, a citizen of the United States, residing at Cleveland, in the county of Cuyahoga and State of Ohio, have invented certain new and useful Improvements in Die-Stocks, of which the following is a specification.

The invention relates to die stocks for cutting screw threads upon cylindrical bars and pipes.

The objects of this invention are to provide novel means for receding the dies as the thread is cut to form tapered threads; to provide means for retracting the dies from the work after the thread has been cut to permit the ready removal of the die stock from the work; to provide means for changing the dies to cut threads on various sized pipes and bars in connection with the foregoing feature; and to provide an oil reservoir for lubricating the rotating parts and means for preventing the chips from working between the said parts.

With the above and other objects in view this invention is embodied in the construction, arrangement and combination of parts as hereinafter described and claimed and as shown in the accompanying drawings, in which similar reference characters indicate similar parts, and in which,—

Figure 2:
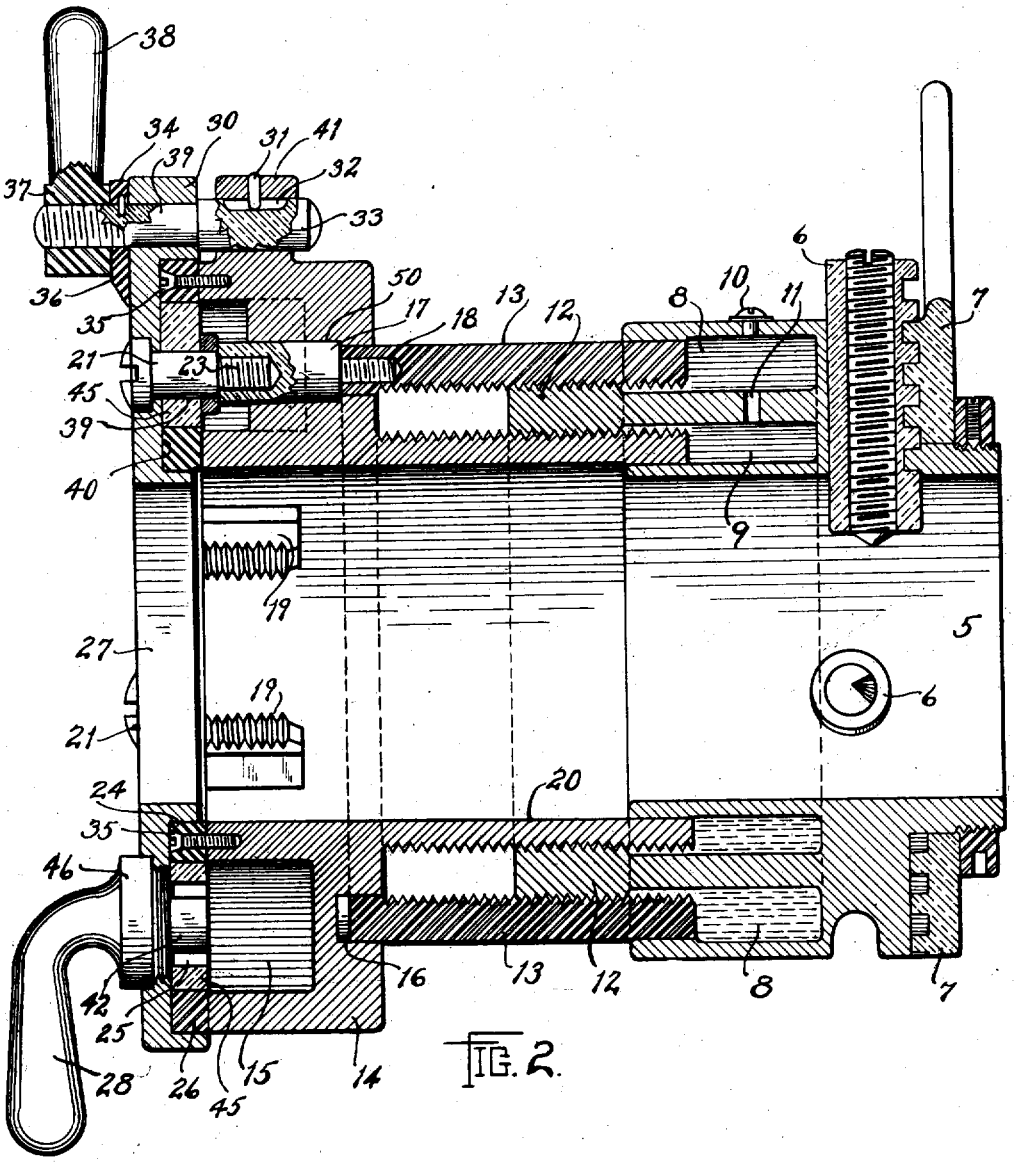
Figure 3:
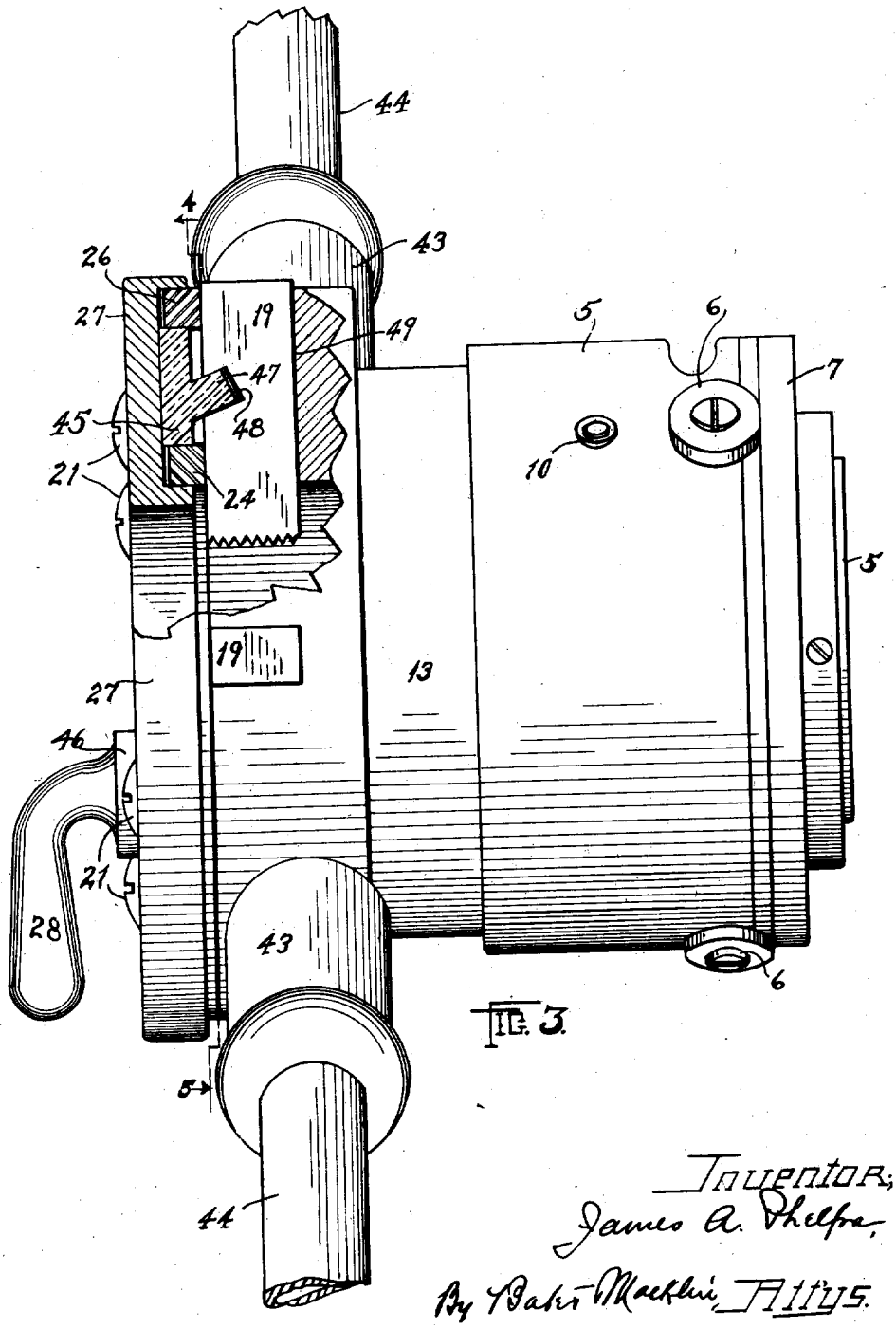
Figure 4:
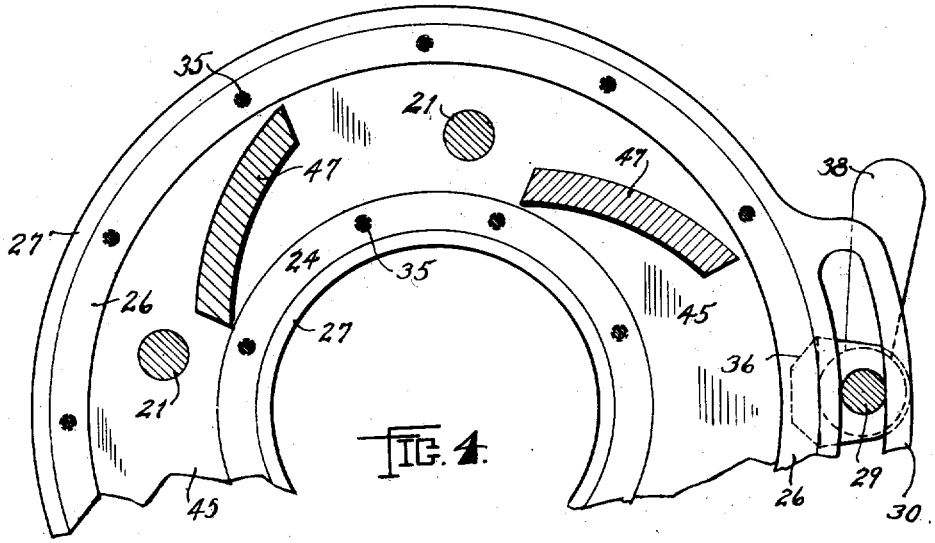
Figure 5:
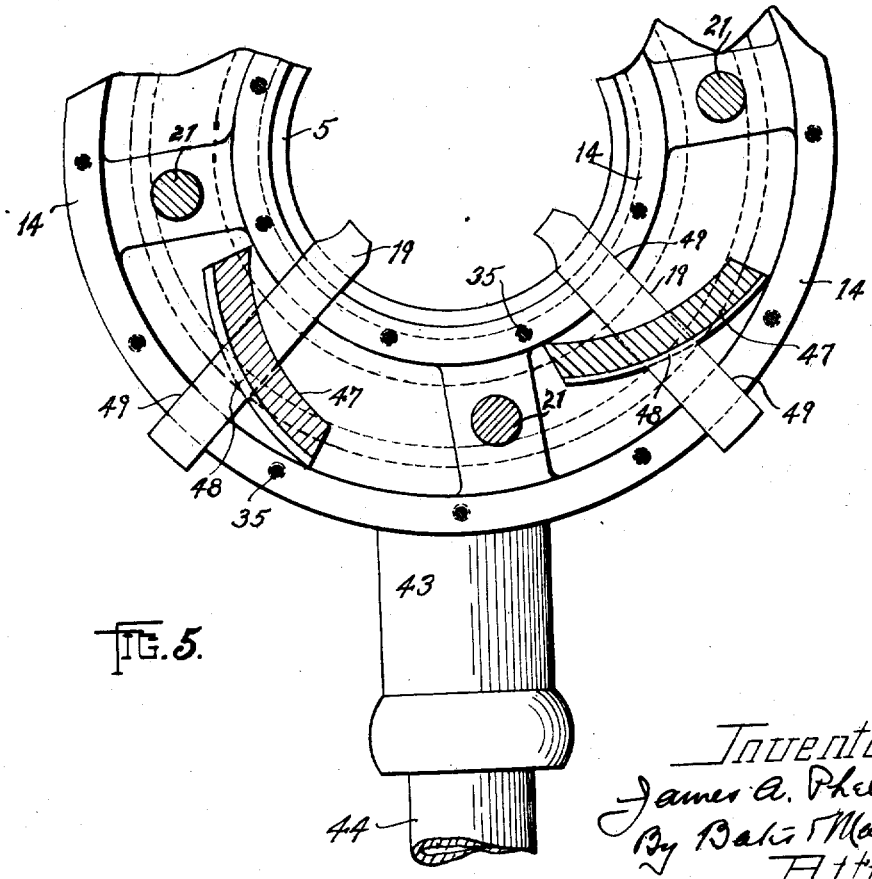

Figure 1 is a front view of the die stock. Fig. 2 is a section on the line 2—2 of Fig. 1, parts being shown in moved position for purpose of clearness. Fig. 3 is a view taken in a diagonal position between the top and side as indicated by the arrow 3 in Fig. 1, parts broken away and the relative parts being shown as telescoped. Figs. 4 and 5 are incomplete cross sections on the line 4—5 of Fig. 3 looking respectively toward the front and rear of the die stock.

Referring specifically to the drawings, 5 indicates the tubular work holder or body of the die stock which has several work engaging members 6 mounted in the rear end thereof. These members 6 are arranged to be given an outward and inward thrust by the cam plate 7 to engage or release the work to hold the work and body 5 securely together. This device being old in the art is therefore not described in detail and is just shown as a means for securing the work and body together.

Concentric annular recesses 8 and 9 are formed in the front end of the body which form an annular wall 12 or common wall of the recesses. This wall 12 carries external and internal screw threads on its outer portion. For convenience in cutting the threads thereon, the wall projects beyond the remainder of the body and the threads are formed only on such projecting portion.

A duct 11 passes through the wall 12 to form a communicating passage between the two recesses 8 and 9 which form oil reservoirs. A suitable valve or cap 10 passes through the body 5 from the exterior thereof to the recess 8 to provide an inlet for injecting oil or the like into the recess 8. The oil also enters recess 9 through the duct 11.

14 indicates the die holder, being annular in shape and having the rear tubular extension 20 which has external screw threads thereon, and this die holder has the annular recess 15 in the front end thereof and four die ways 49 cut in the said end in which the dies 19 are radially slidable. An annular groove 16 is arranged in the rear end of the die holder 14 and is concentric with the tubular extension 20, being spaced outwardly therefrom. The forward end of a sleeve 13 fits within the groove 16 and has internal screw threads cut therein. The sleeve 13 is in screw threaded engagement with the external surface of the wall 12, while the tubular extension 20 of the die holder is in engagement with the internal threads of the wall 12. The inner and outer faces of the rear portions of the extension 20 and sleeve 13 fit snugly but slidably into the respective recesses 9 and 8.

The pitch of the threads of the extension 20 is the same as the pitch of the thread cut by the dies 19, thus as the die holder is turned the same is led inward to properly lead the dies 19 on the work, while the pitch of the threads on the sleeve 13 is slightly less than the pitch of the threads on the said extension, whereby the said sleeve moves a little slower longitudinally than the die holder as the die holder is turned, for the purpose hereinafter described.

An annular plate 27 is arranged in front of the die holder 14 and has an annular channel 40 in the rear face thereof adjacent the recess 15 of the die holder. An outer ring 26 and an inner ring 24 fit snugly within the outer and inner side walls, respectively, of the channel 40 and are secured rigidly to the outer end of the die holder 14 by means of screws 35. These rings 24 and 26 receive between them a cam ring or plate 45 having four cams or cam leaves 47 on the rear face thereof. These cams are not only curved away laterally from the center as has been heretofore used but diverge outwardly toward their rear ends,—or, in other words, are inclined in cross-section, as shown in Fig. 3. The dies 19 have correspondingly shaped and inclined notches 48 into which the said cams fit.

A plurality of studs 17, preferably four, pass through arcuate slots 50 in the die holder from the groove 16 into the recess 15 and have reduced inner ends 18 which are screw threaded and engaged in the front end of the sleeve 13 to make the studs 17 rigid therewith. Bolts 21 pass through the plate 27 from the front face thereof in alinement with studs 17 and have the reduced inner ends of the studs 17. The body of the bolts 21 are smaller in diameter than the studs 17 and a washer 22 is arranged on each bolt 21 and seats on the stud 17. These bolts 21 also pass through the arcuate slots 39 in the cam ring 45.

By the construction described, the plate 27 and sleeve 13 are made to revolve together but the plate and sleeve have a longitudinal slidable movement, and also the possibility of a limited rotary movement with respect to the die holder. The cam ring 45 has the possibility of a limited rotary movement with respect to the plate 27 and die holder 14 as allowed by the slots 39, but this cam ring is held snugly against the plate 27 by the washers 22.

The purpose of the limited rotary movement referred to will be hereinafter described. The longitudinal movement is to cause the recession of the dies according to the taper of the thread being cut. Thus if the die stock starts working with the parts substantially in the position shown in Fig. 2, the dies 19 will be in their innermost positions, then, as the threading progresses, the sleeve 13 will gradually move farther into the groove 16 and this, by reason of the pins 17, will shove the cam ring longitudinally whereby the inclined ribs 47 come for instance into the position shown in Fig. 3. This causes the dies to gradually move radially outward to cut a tapered thread. The pitch of the thread cut is the same as that of the thread on the holder sleeve 20.

While the threads on the sleeve 20 must have the same pitch as the threads to be cut on the pipe, the threads on the sleeve 13 may have any suitable pitch less than the pitch of the sleeve 20, by properly inclining the ribs 47. The more nearly the two threads approach each other in pitch the less will be the relative outward advance of the sleeve 13 and the greater must be the taper of the ribs 47 to compensate therefor. The angularity of the cam rib must be as many times the taper of the thread to be cut as the amount of longitudinal movement of the die carrier is times the amount of forward travel of the cam-carrying sleeve relative to the die carrier.

As an example, the die of the size shown in the drawings is adapted to cut sizes of pipe of from one to two inches, which sizes have a standard number of threads per inch, namely, eleven and one-half. The threads on the sleeve 20, then, are made 11-1/2 threads per inch, and the thread on the sleeve 13 may be conveniently made 12-1/2 threads to the inch. Accordingly then, when the die stock has made eleven and one-half rotations, the die carrying sleeve would have traveled one inch and the cam controlling sleeve would move less than one inch, namely, 23/25 inches, so that the cam controlling sleeve would have moved relatively forward 2/25 inches while the die carrying sleeve was traveling one inch. Therefore, the incline of the cam would have to be twelve and one-half times that of the taper to be cut on the pipe.

This concrete example is simply by way of illustration, but in any case, the incline of the cam 47 bears the same relation to the taper of the thread as the number of threads per inch on the cam sleeve bears to the difference between the number of threads on the two sleeves. This gives us a formula as follows:

Let $t$=angularity or taper of thread to be cut;

T=angularity or incline of the cam $n$=number of threads per inch on the die-carrying sleeve N=number of threads per inch on the cam-carrying sleeve.

Then $$T:t=N:N-n$$

Or, $$T(N-n)=tN$$

Or, $$T=t\frac{N}{N-n}$$

The standard taper of pipe threads is three-fourths of an inch to the foot, on the diameter, which is equivalent to slightly less than one degree and forty-eight minutes, the taper on the cam being twelve and one-half times that is twenty-one degrees, fifty-two minutes plus.

The cam ring 45 has a radial slot 25 in its lower end in which projects the eccentric lug 42 of the head 46 which is screw threaded into the plate 27. This head 46 has a handle 28 for turning same, and as it is turned the eccentric lug 42 working in slot 25 causes the rotation of the cam ring 45 to move the dies 19 radially to or from the center of the device to engage or disengage the work, the cams 47 sliding laterally in the notches 48 of the dies to move the same. This forms convenient means for retracting the dies from the work when the thread has been cut on the work. Normally the eccentric lug is held tightly to the plate 27, by reason of the screw-threaded head firmly seating against the plate.

An eye 41 is arranged on the top (Figs. 1 and 2) of the die holder 14, and a lip 30 is arranged on the upper end of the plate 27 in front of the eye 41 and has an arcuate slot therein. A pin 33 slidably occupies the eye 41 and has a shoulder abutting the rear face of the lip 30 and has a reduced extension 29 passing through the arcuate slot in the lip 30, being screw threaded on its outer end. The pin 33 has a longitudinal groove 32 therein in which a key 31 projects from the eye 41 to prevent the pin from revolving and allowing the sliding movement thereof in the eye. A pointer 36 is secured on the extension 29 and is held from movement thereon by a key 34. A nut 37 having the handle 38 is screwed on the end of the extension 29 to clamp the lip 30 tightly between the pointer 36 and the pin 33 thus holding the plate 27 against rotation independent of the die holder 14.

Upon loosening the nut 37, the plate 27 can be given a partial rotation, carrying the cam ring with it, to adjust the dies 19 for various sizes of stock, a scale of graduations being arranged on the plate 27 upon which the pointer 36 indicates the size to which the dies have been set. The nut 37 is then tightened and the device is ready for use. This mechanism forms suitable means for changing the size of the threads to be cut.

In operation, the body 5 is secured on the work, the work being brought against the dies 19. The die holder 14 is then rotated in the proper direction by handles 44 disposed in sockets 43 provided on the holder and the dies are carried around the work and are led backward thereon by the lead threads on the tubular extension 20 as described, the plate 27, cam ring 45, sleeve 13 and die holder all being rotated in unison. As the die holder works its way backward, the sleeve 13 has a slower rate of longitudinal movement, thus causing the plate 27 and cam ring 45 to be gradually forced longitudinally away from the die holder. As the cam ring 45 moves longitudinally away from the die holder, the movement of the inclined engaging faces of the cam ribs against the walls of the die notches results in the dies moving radially outward, thus receding slowly from the center and cutting a tapered thread on the work.

When the thread has been cut on the work, the handle 28 is turned to swing the cam ring 45 and the dies are thereby retracted from the work. The movable die holder is reversed to bring it to normal position, and the body 5 having been removed from the work and handle 28 having been turned back, the device is ready for a new operation.

It will be seen that the sleeve 13 and tubular extension 20 telescope into the recess 8 and 9 and the threads are lubricated by the oil contained within the said recesses. They are also in this manner protected from chips cut from the work.

It will be seen that by my mechanism the objects of the invention are attained in an efficient and novel manner, it being understood that this device is susceptible of alterations in its construction, arrangement and combination within the scope of the appended claims, without departing from the spirit of the invention. It is also understood that instead of rotating the die holder and dies the work and work holder may be rotated, which is a mere reversal of operation.

Having thus described my invention, what I claim is:—

1. In a die stock, a work holder, a die holder rotatably mounted thereon to move longitudinally, a die carried by the die holder, and a member rotatable with the die holder and movable at a different rate of longitudinal speed and connected to the die to move same radially.

2. In a device of the character described, the combination of a work holder, a die holder having a screw threaded engagement therewith, a die carried by the die holder, a member having a screw threaded engagement with the work holder, the pitches of the above mentioned screw threads being varied, and operative means connected to the said member and die to move the die radially upon the die holder being rotated.

3. In a device of the character described, the combination of a rotary frame, dies carried thereby, a member having an inclined engagement with the dies and rotatable with the frame but capable of relative longitudinal movement, and a differential screw-threaded mechanism for causing the relative longitudinal movement.

4. In a device of the character described, the combination of a rotary frame, dies carried thereby, a member having an inclined engagement with the dies and rotatable with the frame but capable of relative longitudinal movement, and a device adapted to be clamped to the work to be threaded and having respectively different screw-threaded connections with the die carrier and said member.

5. In a die stock, the combination of a member adapted to be clamped to the work to be threaded, a rotary die carrier having a screw threaded engagement with said clamped member by threads of the same pitch as those to be cut, another member having a screw threaded engagement with said clamped member by threads of a different pitch, and an inclined device engaging the dies and moved relative thereto by reason of such differential threading.

6. In a die stock, the combination of a member adapted to be clamped to the work to be threaded, a rotary die-carrier having a screw threaded engagement with said clamped member by threads corresponding to those to be cut, another member having a screw threaded engagement with said clamped member by threads differing from those to be cut, and means provided with inclined surfaces engaging shoulders on the dies and carried by the member having the thread different from the thread to be cut.

7. In a die stock, the combination of a sleeve adapted to be clamped stationarily to the work and having internal and external threads, a die carrier having external threads engaging the internal threads of the sleeve, a member having internal threads engaging the external threads of the sleeve, said external threads of the sleeve being of a different pitch from the internal threads, dies carried by the die carrier, and means having an inclined engagement therewith and connected with the member which engages the external threads of the stationary sleeve.

8. In a die stock, the combination of a member adapted to be clamped to the work, a rotary die carrier screw threaded to said member, a recession-controller screw threaded to said member by a thread of different pitch from the die carrier thread, and independent means for moving the dies outwardly to free them from the cut pipe.

9. In a die stock, a work holder, a die holder rotatably mounted thereon to move longitudinally, a die carried by the die holder, and a cam plate rotatable with the die holder and at a different rate of longitudinal speed and having a cam to move the die radially.

10. In a device of the character described, the combination of a work holder, a die holder having a screw threaded engagement therewith, a die carried by the die holder, a member having a screw threaded engagement with the work holder, the pitches of the above mentioned screw threads being varied, and a cam plate movable with the said member and having a cam which diverges away from the center of the work holder toward one end thereof, the said cam being engaged to the said die.

11. In a device of the character described, the combination of a work holder, a die holder rotatably mounted thereon, a die carried by the die holder, a plate rotatable with the die holder and having a longitudinal movement therewith, a cam plate carried longitudinally with the said plate and rotatable therewith having a cam thereon which curves laterally away and diverges toward one end from the center of the die holder and which engages the said die, means for moving the said plate longitudinally with respect to the die holder upon the die holder being rotated, and means for rotating the cam plate with respect to the said plate.

12. In a device of the character described, the combination of a work holder, a die holder rotatably mounted thereon, a die carried by the die holder, a plate rotatable with the die holder and having a longitudinal movement therewith, a cam plate carried longitudinally with the said plate and rotatable therewith having a cam thereon which curves laterally away and diverges toward one end from the center of the die holder and which engages the said die, means for moving the said plate longitudinally with respect to the die holder upon the die holder being rotated, means for rotating the cam plate with respect to the said plate, and means for adjusting the said plate with respect to the die holder to adjust the die therein.

13. A device of the character described comprising a work holder, a die holder having a screw threaded engagement with the work holder, a die carried by the die holder, a sleeve concentric with the die holder and having a screw threaded engagement with the work holder, the screw threads of the die holder and sleeve being varied in pitch, a plate mounted to move with the said sleeve, a cam ring mounted to move with the said plate and having a cam thereon which curves laterally away and diverges toward one end from the center of the die holder and which engages the said die and means for rotating the cam ring with respect to the said plate.

14. A device of the character described comprising a work holder, a die holder having a screw threaded engagement with the work holder, a die carried by the die holder, a sleeve concentric with the die holder and having a screw threaded engagement with the work holder, the screw threads of the die holder and sleeve being varied in pitch, a plate mounted to move with the said sleeve, a cam ring mounted to move with the said plate and having a cam thereon which curves laterally away and diverges toward one end from the center of the die holder and which engages the said die, means for rotating the cam ring with respect to the said plate, and means for adjusting the said plate with respect to the die holder to adjust the die therein.

15. In a die stock, the combination of a sleeve adapted to be clamped stationarily to the work, a die carrier having a screw threaded engagement with said sleeve by a thread having a pitch corresponding to the thread to be cut, another member having a threaded engagement with said stationary sleeve by a thread of finer pitch than the thread to be cut, dies carried by the carrier, and an inclined device engaging the dies and connected with the member having the finer thread.

16. In a die stock, the combination of a sleeve adapted to be clamped to the work, a die carrier having a screw threaded engagement with said sleeve by a thread having a pitch corresponding to the thread to be cut, a second member having a threaded engagement with said sleeve by a thread of finer pitch than the thread to be cut, dies carried by the carrier, a device on a forward side of the dies having an inclined engagement therewith, and means extending movably through the die carrier parallel with the axis thereof and connecting said inclined device with said second member.

17. In a die stock, the combination of a sleeve adapted to be clamped to the work and having internal and external threads, a die carrier engaging the internal threads, a movable sleeve engaging the external threads, dies carried by the die carrier, a bodily movable annular member in front of the dies and having an annular recess on its rear side, a cam plate in said recess having inclined ribs engaging the dies, and means connecting the movable front member with said movable sleeve.

18. In a device of the character described, the combination of a work holder having concentric annular recesses in the front end thereof, a die holder and a sleeve having a screw threaded engagement with the wall between the recesses and adapted to telescope into the said recesses, the screw threads of the respective parts being varied in pitch, dies carried by the die holder, and an operative connection between the said sleeve and dies for moving dies radially upon the die holder and sleeve being rotated.

19. In a device of the character described, the combination of a work holder having concentric annular recesses in the front end thereof, a die holder and a sleeve having a screw threaded engagement with the wall between the recess and adapted to telescope into said recesses, the screw threads of the respective parts being varied in pitch, and the die holder and sleeve having a snug sliding engagement with the unthreaded walls of said work holder bounding said recesses, dies carried by the die holder, and an operative connection between the said sleeve and dies for moving the dies radially upon the die holder and sleeve being rotated, there being means for admitting oil to said annular recesses.

In testimony whereof, I hereunto affix my signature.

JAMES A. PHELPS.

Witnesses:
PETER REIMUND,
JUSTIN W. MACKLIN.

Copies of this patent may be obtained for five cents each, by addressing the "Commissioner of Patents, Washington, D. C."